United States Patent [19]
Sudo et al.

[11] Patent Number: 4,935,042
[45] Date of Patent: Jun. 19, 1990

[54] EXHAUST GAS TREATING DEVICE

[75] Inventors: Takatoshi Sudo, Yokohama; Shigeru Ukawa, Kawasaki; Hiroshi Maeno, Tokyo; Noriyuki Oda, Chiba, all of Japan

[73] Assignee: Asahi Glass Company Ltd., Tokyo, Japan

[21] Appl. No.: 278,466

[22] Filed: Dec. 1, 1988

[30] Foreign Application Priority Data

Dec. 1, 1987 [JP] Japan .................................. 62-301585
Dec. 1, 1987 [JP] Japan .................................. 62-301586

[51] Int. Cl.⁵ .................................................. F01N 3/02
[52] U.S. Cl. ........................................ 55/484; 55/523; 55/DIG. 30; 60/311
[58] Field of Search ......... 55/482, 484, 523, DIG. 30; 60/311

[56] References Cited

U.S. PATENT DOCUMENTS

| | | | |
|---|---|---|---|
| 4,276,071 | 6/1981 | Outland | 60/311 |
| 4,364,761 | 12/1982 | Berg et al. | 55/DIG. 30 |
| 4,441,899 | 4/1984 | Takagi et al. | 55/DIG. 30 |
| 4,466,817 | 8/1984 | Faas et al. | 55/DIG. 30 |
| 4,504,294 | 3/1985 | Brighton | 55/DIG. 30 |
| 4,631,076 | 12/1986 | Kurihara et al. | 55/DIG. 30 |
| 4,636,232 | 1/1987 | McDowell | 55/484 |

FOREIGN PATENT DOCUMENTS

| | | | |
|---|---|---|---|
| 56-124417 | 9/1981 | Japan . | |
| 59-225721 | 12/1984 | Japan . | |
| 61-101228 | 5/1986 | Japan | 55/523 |
| 62-225221 | 10/1987 | Japan | 55/523 |
| 192192 | 10/1964 | Sweden | 55/484 |

*Primary Examiner*—Bernard Nozick
*Assistant Examiner*—C. Scott Bushey
*Attorney, Agent, or Firm*—Oblon, Spivak, McClelland, Maier & Neustadt

[57] ABSTRACT

A plate-like filter element includes a plate-like body made of a gas-permeable porous material having a pair of opposing end faces, a plurality of through holes formed in the plate-like body from one of the end faces to the other, wherein the plurality of through holes have inner wall surfaces which extend out toward both side surfaces of the plate-like body, the side surfaces being closer to the through holes. A filter unit is formed by a plurality of the plate-like filter elements stacked up in parallel to each other so that the end faces of the stacked filter elements are aligned, and passages separated from the through holes by the porous walls of plate-like bodies are formed between the adjacent filter elements. A filter device includes a metallic casing with an inlet for a dust-containing gas, an outlet for clean gas and an outlet for dust, which firmly support the filter unit therein.

18 Claims, 3 Drawing Sheets

EXHAUST GAS TREATING DEVICE

BACKGROUND OF THE INVENTION

1. Field of the Invention

The present invention relates to a plate-like filter element, a filter unit formed by stacking up a plurality of the filter elements or a filter device installed therein, the filter unit being used to mainly trap or remove particulates contained in an exhaust gas discharged from a diesel engine which is mainly used for various vehicles, vessels or industrial appliances.

An exhaust gas discharged from a diesel engine contains particulates including carbon particles as a main component at a fairly high content, which causes air pollution.

2. Description of the Related Art

Various devices have been proposed to trap or remove the particulates contained in the exhaust gas by using a filter means.

Figure 9:
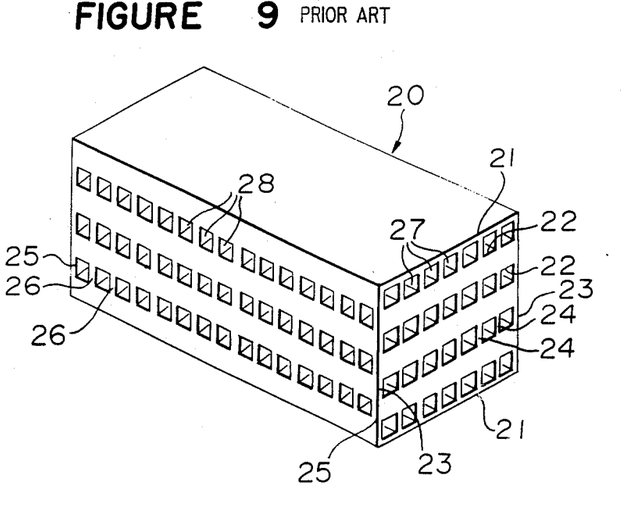
FIG. 9 is a perspective view of a conventional filter unit.

For instance, Japanese Unexamined Patent Publication No. 124417/1981 discloses a filter unit 20 made of ceramics as shown in FIG. 9. The filter unit 20 shows an outer configuration of a rectangular prism as a whole and comprises a plurality of (eight in FIG. 9) rectangular plate-like bodies 21, 22 placed in parallel to each other, vertical end ribs 23, 25 and a number of intermediate ribs 24, 26.

All the plate-like bodies 21, 22, ribs 23, 25 and intermediate ribs 24, 26 or at least the plate-like bodies 22 are made of gas-permeable porous thin ceramic wall having a filtering function. The plate-like bodies 21 constitute the upper and lower walls of the filter unit 20, and the plate-like bodies 22 constitute the intermediate walls. Between adjacent plate-like bodies 21, 22 and between adjacent plate-like bodies 22, 22, the end ribs 23 and the intermediate ribs 24 are respectively interposed so as to be in parallel to one side of the plate-like body 21. The upper edges of the ribs 23, 24 are jointed to the upper plate like body 21 or 22, and the lower edges of the ribs 23, 24 are jointed to the lower plate-like body 22 or 21, whereby a plurality of particulate-containing gas passages 27 with both ends opened are formed. In one side of the plate-like body 22, the ribs 23, 24 are formed, and in the other side of the same plate-like body 22, the ribs 25, 26 are formed extending in the direction perpendicular to the ribs 23 24. The ribs 25, 26 are formed substantially in the same manner as the ribs 23, 24 and differ in that they are formed in the direction perpendicular to that of the ribs 23, 24. Thus, a plurality of particulate-containing gas passages 27 and clean gas passages 28 with both ends opened are alternately formed, where the direction of passages of the former is perpendicular to the passages of the later.

In the filter unit, both ends of the particulate-containing gas passages 27 are opened, but the openings at their one side of the passages 27 are directly or indirectly closed, and an exhaust gas from a diesel engine is introduced from the openings of the other side of the filter unit 20. Or, alternatively, the exhaust gas from the diesel engine can be introduced from the openings opened at the both ends simultaneously. The plate-like bodies 22 function as a filter wall, and particulates are trapped on the surface of the plate-like bodies 22 at the side of the particulate-containing gas passages 27, whereby a clean gas without particulates passes through the plate like bodies 22 and then to the outside of the filter unit via the clean gas passages 28. The trapped carbonaceous particulates in the exhaust gas are removed by burning when the plate-like bodies 22 are heated at appropriate time intervals. Thus, the filter unit 20 is refreshed.

In the prior art technique as described above, the carbon particulates collected are burnt off by heating the plate-like bodies 22 having a filtering function to the ignition temperature of the particulates to thereby remove them. However, the plate-like bodies 22 are exposed repeatedly to a high temperature when the particles are periodically burnt off. Accordingly, sintering of the plate-like bodies is further accelerated, whereby a distribution of pore size originally formed changes to thereby increase a pressure loss during the particulates trapping operation. This causes difficulty in maintaining a stable performance of the filter unit. Further, a damage by fusion of the plate-like bodies 22 may take place when they are subjected to a high temperature at the time of burning off the particulates. When such damage occurs, it is no more possible to trap the particulates.

The particulates of exhaust gas from the diesel engine contains not only carbon but also an unnegligible amount of non-combustible components (for instance, 1%-5% by weight to the total amount of the particulates), and these non-combustible components are also trapped by the filter unit. Furthermore, the exhaust gas contains components such as SOx and NOx, which corrode materials constituting conduit elements to produce non-combustible solid components which deposit on the filter unit. These non-combustible solid components can not be removed by burning and accumulate in the filter unit to cause clogging, whereby properties of the filter unit are deteriorated.

Japanese Unexamined Patent Publication No. 225721/1984 discloses a dust removing apparatus for a hot dust-containing gas. The dust removing apparatus comprises a plurality of vertical filter tubes having both ends opened. A dust-containing gas is introduced from the upper portion of the filter tubes. Dusts hindered by the filter tube walls from passing therethrough are moved downwardly in the filter tubes and are collected in a dust hopper provided below the filter tubes, while a clean gas obtained by passing through the filter tube walls is discharged from the side walls of the filter unit. It is understood that the dust removing apparatus disclosed in this document is suitable for treating a large flow rate of gas containing noncombustible combustible dusts discharged from an apparatus such as a converter in an iron plant. However, the document does not suggest application of the apparatus to the treatment of an exhaust gas from a diesel engine.

Supposing this kind of system for a compact filter unit, it is easy to manufacture the simple shaped filter tubes, but there is such a problem that an assembling process requiring much labor and time is needed in order to fix a number of thin filter tubes to support plates with spaces among the tubes and it is not easy to manufacture a filter unit having a large capacity.

Figure 10:
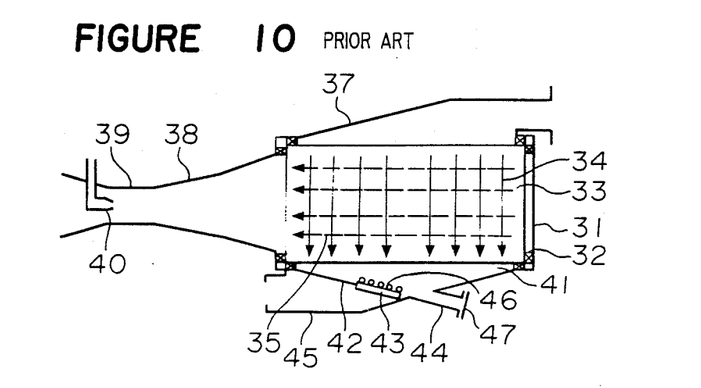
FIG. 10 is a diagram showing an example of a filter device in which the filter unit shown in FIG. 9 is used.

The applicant of this application proposed (in Japanese Patent Application No. 232360/1987) a filter device for an exhaust gas from the diesel engine as shown in FIG. 10 in order to solve the above-mentioned problem.

A typical example of such device will be described.

A filter unit 33 having a rectangular solid form which is substantially the same as the filter unit shown in FIG. 9 is used.

The filter unit is secured in a casing 31 having openings at upper and lower parts and a side port by interposing sealing members 32 as shown in FIG. 10. In passages and respectively have one end closed and the 34 which vertically pass through the filter unit 33 (as shwon by solid line arrow marks in FIG. 10) and clean gas passages 35 (as shown by broken line arrow mark in FIG. 10) which cross the particulate-containing gas passages and respectively have one end closed and the other end opened, and each passages are defined by plate-like bodies 22 made of a gas-permeable porous material.

An inlet duct 37 is formed at the upper part of the casing 31 to introduce an exhaust gas from the diesel engine. An outlet conduit 38 is connected to the casing 31 at a side where the clean gas passages 35 are open. The outlet conduit 38 is provided with a throat portion 39 having a reduced diameter part, and the portions contiguous to the upstream and the downstream of the throat portion are gently expanded. A nozzle 40 for ejecting a pressurized gas, which is used for back washing, is provided near the downstream side of the throat portion 39 so as to open toward the upstream side.

A particulate receiving section 41 is provided at the lower part of the casing 31. The particulate receiving section 41 is provided with a tray 42, a filter plate 43 with an electric resistance type heater 46, an ash component removing port 44 with a removable cover plate 47 (it is usually closed), and a gas duct 45.

A part of the bottom of the tray 42 is perforated and the filter plate 43 is fitted to that part so that the tray 42 and the filter plate 43 surround as a whole all the lower open ends of the particulate-containing gas passages 34 of the filter unit 33. The ash component removing port 44 is open at the bottom of the tray 42, and the gas duct 45 is placed below the filter plate 43. The filter plate 43 is made of a gas-permeable porous material. The ratio of a filtering area of the filter plate 43 to that of the filter unit 33 is such that about 20% or lower portion, especially about 0.5%-5% portion, therefore, small portion of the total exhaust gas introduced from the inlet duct 37 passes through the filter plate 43, and the remaining portion of the exhaust gas passes through the plate-like bodies 22 of the filter unit 33 to be flown to the outlet conduit 38.

The exhaust gas from the diesel engine is introduced from the inlet duct 37 via the upper open ends into the particulate-containing gas passages 34 of the filter unit 33. The most part of the exhaust gas passes through the plate-like bodies 22, the clean gas passage 35 and is flown to the outlet conduit 38. However, particulates in the exhaust gas are trapped by the plate-like bodies 22 and deposit on the inner surfaces of the particulate-containing gas passages 34. A part of the particulates flow to the particulate receiving section 41 together with a part of the exhaust gas through the lower open end of the particulate-containing gas passages 34. The part of the exhaust gas passes through the filter plate 43 to the gas duct 45. However, the particulates in the part of the exhaust gas can not pass through the filter plate 43 and deposit on the inner surface of the filter plate 43.

After a continuation of the particulate trapping operation for an appropriate period, a short time back washing operation is carried out. In the back washing operation, a pressurized gas, especially pressurized air is ejected from the nozzle 40 for a short time such as about 0.1 sec-1 sec. The ejected gas induces the gas around the nozzle 40, and the gas of several times as much as the original ejected gas is flown in a pulse form to the clean gas passages 35. The pulse gas flow is flown to the particulate-containing gas passages 34 through the plate-like bodies 22. Then, the particulates accumulated on the inner surface of the particulate-containing gas passages 34 are peeled off. A part of the particulates drifts in the particulate-containing gas passages 34, however, the most part drops into the particulate receiving section 41. In the particulate receiving section 41, a stream of gas is produced to pass through the filter plate 43, and being carried with the gas flow, the most part of particulates deposit and accumulate on the inner surface of the filter plate 43.

Thus, the particulates trapped on the inner surfaces of the particulate-containing gas passages 34 during the particulate trapping operation are moved onto the inner surface of the filter plate 43 by the back washing operation to thereby refresh the filtering function of the filter unit 33. The particulates on the filter plate 43 are burnt and removed by heating the electric resistance type heater 46.

After a relatively long term use of the apparatus, there occurs accumulation of non-combustible residue or ash. In this case, the cover plate 47 is opened to remove the residue or ash. Alternatively, they may be forcibly removed by a suitable scraping means.

However, the above-mentioned filter device had a disadvantage as follows. When the back washing gas was introduced in a pulse form into the clean gas passages 35 repeatedly, a high gas pressure head such as about 0.3-0.4 kg/cm$^2$ is instantaneously applied to the inside of the clean gas passages 35. Each application of the pressure head induces a stress to the plate-like bodies 22 which separate the clean gas passages 35 from the particulate-containing gas passages 34 in the filter unit 33 and finally damages the plate-like bodies 22.

Further, the conventional filter unit as shown in FIG. 9 had a complicated structure which requires much labor and long manufacturing time and the yield rate is low.

SUMMARY OF THE INVENTION

It is an object of the present invention to provide a filter element having a construction sufficiently durable to the bending stress repeatedly applied by the back washing gas pressure head, a filter unit easy to manufacture and providing a good yield, which is constituted by stacking the plate-like filter elements, and a filter device using such filter unit.

According to an aspect of the present invention, there is provided a plate-like filter element which comprises a plate-like body made of a gas-permeable porous material having a pair of opposing end faces, a plurality of through holes formed in the plate-like body from one of the end faces to the other, wherein the plurality of through holes have inner wall surfaces buldged out toward the both side surfaces of the plate-like body, the side surfaces being closer to the through holes.

As a preferable embodiment of the present invention, there is provided a plate-like filter element wherein the plate-like body has rectangular side wall faces, and the shape in cross-section of each of the through holes taken along a plane perpendicular to the center lines of the holes is one selected from the group consisting of a circle, an ellipse and a polygon having 4 (four) corners or more.

As a preferred embodiment of the present invention, there is provided a plate-like filter element wherein each center line of the plurality of through holes is substantially linear and extends generally in parallel to each other in addition that the openings of the plurality of through holes at the opposing end faces are substantially aligned.

As another preferred embodiment of the present invention, there is provided a plate-like filter element wherein ribs are formed along the edges of the opposing end faces so as to project at the edges on the side of the side surface ajoining the end faces.

As a preferred embodiment of the present invention, there is provided a plate-like filter element wherein ceramics is used for the air-permeable porous plate-like body, and sintered metal or porous glass may be used depending on a kind of a particulate-containing gas to be treated.

According to another aspect of the present invention, there is provided a filter unit which comprises a plurality of plate-like filter elements, each of which is constituted by a plate-like body being made of a gaspermeable porous material having a pair of opposing end faces, and a plurality of through holes extending from one of the end faces to the other, wherein the plurality of through holes have inner wall surfaces buldged out toward both side surfaces of the plate-like bodies, the side surfaces being closer to the through holes, the plurality of plate-like filter elements being stacked up in parallel to each other so that the each pair of opposing end faces with through hole openings of the stacked filter elements are aligned, and passages separated from the through holes by the porous walls of the plate-like bodies are formed between the adjacent filter elements.

In a preferred embodiment of the filter unit according to the present invention, the passages are open at both sides of a pair of the opposing end faces which are different from the opposing end faces where the openings of the plurality of through holes are formed.

In a preferred embodiment of the filter unit according to the present invention, a plurality of the plate-like filter elements, each having ribs projecting along the edges of the pair of opposing end faces and projecting toward the same side surface, are stacked up in parallel to each other so that passages having a width substantially equal to the height of the ribs are formed, and the passages are separated from the plurality of through holes by the porous walls of the plate-like bodies.

In a preferred embodiment of the filter unit according to the present invention, a plurality of the filter elements are stacked up with spacers interposed between the adjacent filter elements so that passages having a width substantially equal to the height of the spacers are formed, and the passages are separated from the plurality of through holes by the porous walls of the plate-like bodies.

In another aspect of the present invention, there is provided a filter device which comprises a filter unit comprising a plurality of filter elements, each having a plate-like body made of a gas-permeable porous material having a pair of opposing end faces, and a plurality of through holes formed in the plate-like body from one of the end faces to the other, wherein the plurality of through holes have inner wall surfaces which extend out toward both side surfaces of the plate-like body, the side surfaces being closer to the through holes, and the filter elements being stacked up in parallel to each other so that each pair of opposing end faces having through hole openings of stacked filter elements are aligned, and passages separated from the plurality of through holes by porous walls of the plate-like bodies are formed between the adjacent filter elements and the passages are open at both sides of a pair of the opposing end faces which are different from the opposing end faces where the openings of the plurality of through holes are formed, and a metallic casing with an inlet for a dust-containing gas, an outlet for clean gas and an outlet for dust, which firmly support said filter unit therein by means of sealing members.

In a preferred embodiment of the filter device according to the present invention, the above-mentioned filter unit is assembled in a metalic casing using a cushion means and/or a spring means as a pushing load.

As a preferred embodiment of the filter device of the present invention, the outlet for clean gas of the device is equipped with an inlet of compressed gas, to effect a back washing operation to refresh the device, and the compressed gas is preferably compressed air.

In a preferred embodiment of the filter device of the present invention, a plurality of the through holes formed in the filter unit are used for flowing a dust-containing gas, and the passage formed between the adjacent filter elements are used for flowing cleaned gas.

In a further preferred embodiment of the filter device of the present invention, an exhaust gas from a diesel engine is treated as the dust-containing gas.

Although the filter unit can be formed by using a single plate-like filter element, it is easy to constitute a filter unit having a desired filtering surface area by stacking an adequate number of filter elements in parallel to each other so that predetermined spaces are formed by means of ribs and/or spacers between the adjacent filter elements.

Namely, in the filter device of the present invention, a plurality of the through holes formed in a plate-like filter element made of a gas-permeable porous material so as to pass through the same are used as dust-containing gas passages, and spaces formed between the adjacent filter elements are used as clean gas passages. When a dust-containing gas is supplied to the through holes, dust in the gas are trapped on the inner wall surface of the through holes of the filter element while only gaseous component is caused to pass through the porous walls, whereby cleaned gas flows within the clean gas passages formed between the adjacent filter element.

The particulates accumulated on the inner wall surface of the through holes are easily peeled off from the inner wall surface by feeding a back washing gas flow into the clean gas passages formed between the filter elements to thereby perform refreshing of the filter unit. A gas pressure head in the back washing operation is applied from the side of the side surface which defines the clean gas passages to the inside of the plurality of the through holes.

In the filter element of the present invention, each of the inner wall surfaces of the through holes is so formed that it is buldged out toward the side surfaces, which are closer to the through holes, of the filter element. Accordingly, a large bending stress is not applied to the porous wall unlike a flat porous wall used for a conventional filter element wherein each of the inner wall surfaces of the through holes does not have a buldged inner wall surface. Thus, the filter element of the present invention can withstand the gas pressure head applied repeatedly when the back washing operations are conducted, and there seldom causes a fatal damage of the porous filter wall.

The side surfaces of the filter element are substantially flat. The side surfaces are in parallel to each other and are bloater than the other surfaces constituting the plate-like body. The through holes respectively extend between the paired flat side surfaces in parallel to them so that they pass through the plate-like body from one end face to the other end face.

The size of the through holes of the filter element can be selected depending on conditions. However, since there is a demand for reducing the filter volume, especially when the filter element is used for trapping particulates in an exhaust gas discharged from a diesel engine, it is preferable that the inner diameter of the through holes is reduced to thereby increase a filtering surface area per volume. However, when the inner diameter is too small, clogging of the through holes occurs. Accordingly, a preferable inner diameter of the through holes is in a range of from about 3 mm to 10 mm and the thickness of the filter element is in a range from about 6 mm to 30 mm.

For instance, when a filter device is used for treating a dust-containing gas produced from a fixed system source and a relatively large filter unit is applicable, a filter element having a thickness of about 1.5 cm–25 cm and the inner diameter of the through hole of 1 cm–20 cm can be used. However, when the weight of a single plate like filter element is too large, it is difficult to handle the filter element by a manual operation. Accordingly, it is preferable that the weight of the unit filter element is 15 kg or less.

Since the plate-like filter element of the present invention has a simple structure, it can easily be manufactured by, for instance, an extrusion process, a casting process and so on, while occurrence of faulty products can be reduced. Further, a filter unit having a desired filtering surface area can be obtained by stacking up an adequate number of the filter elements in parallel to each other and interposing ribs and/or spacers between the adjacent filter elements, followed by bonding or binding them in one piece.

In the filter unit of the present invention, the width of passages used for flowing a cleaned gas which is formed between the adjacent filter elements stacked up in parallel to each other, should be narrow in order to increase a filtering surface area per volume in the filter unit. Preferably, the width of the passages is less than one half of the inner equivalent diameter of the through holes passing through the filter element. However, it is difficult to make the width of the passages very narrow unless accuracy in surface flatness of the side surfaces are increased. Further, when the width of the passages is too narrow, a resistance of feeding the back washing gas is increased to thereby make the back washing difficult. Accordingly, the favorable width of the passages is 1.5 mm or higher.

DESCRIPTION OF THE PREFERRED EMBODIMENTS

Figures 1, 4:
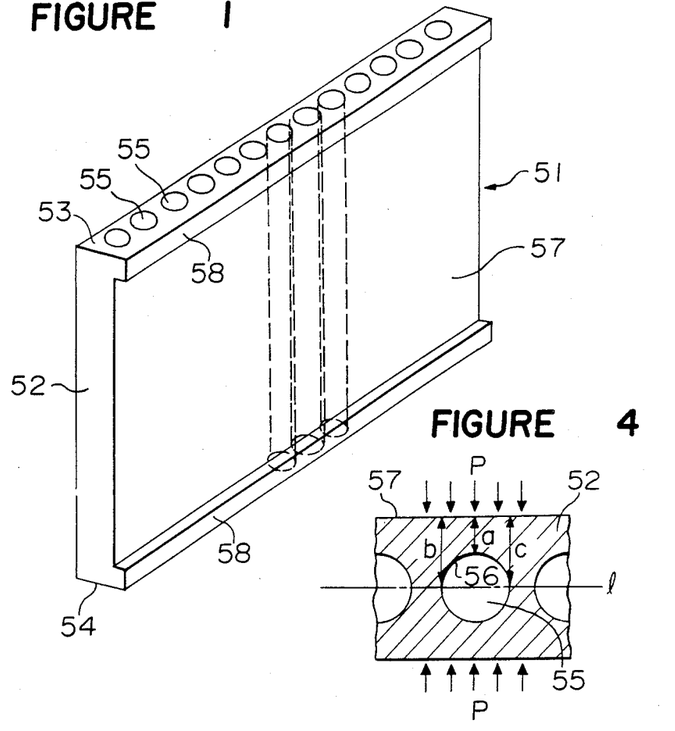
FIG. 1 is a perspective view of an embodiment of the plate-like filter element according to the present invention.
FIG. 4 is a cross-sectional view of the fragmented filter element which illustrates that a gas pressure head is applied to the filter element when a back washing operation is conducted.

Preferred embodiments of the present invention will be described with reference to the drawings, FIG. 1 shows an embodiment of the plate-like filter element according to the present invention.

A plate-like filter element 51 comprises a plate-like body 52 made of a gas-permeable porous material.

As a material for the plate-like body, for instance, ceramics, sintered metal, porous glass may be used. Among these, ceramics such as cordierite, $\beta$-spodumene, aluminum titanate, zircon, mulite, silicon carbide and silicon nitride having excellent characteristics of corrosion resistance, thermal resistance and thermal shock resistance is especially preferable since they are applicable for a treatment of various kinds of dust-containing gas.

A plurality of through holes 55 are formed in the plate-like body 52 so as to extend from one end face 53 to the other end face 54 of a pair of opposing end faces of the plate-like body 52.

In this embodiment, a plurality of the through holes 55 are formed in a single aligned row. However, it is possible to form the through holes in double or triple rows in the plate-like body 52 unless a function intended by the present invention is impaired.

FIG. 4 is a cross-sectional view taken along a plane perpendicular to the center lines of the plurality of through holes which are formed in the filter element in parallel to each other. Each of the inner wall surface 56 of the through holes 55 is buldged out toward the side surfaces, which are closer to the through holes, with respect to an intermediate line l in the thickness direction of the plate-like body 52. In more detail, the shape in cross-section of each of the through holes is so formed as to have relations of $b > a$ and $c > a$ where the distance between a side surface 57 and the central portion of the inner wall surface 56 is referred to as a and the distance between the side surface 57 and both end portions of the inner wall surface 56 which intersect the intermediate line l is referred to as b and c.

Figure 5:
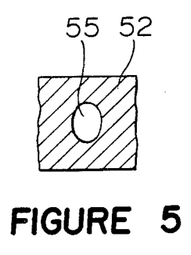
FIGS. 5 through 8 are respectively cross-sectional views of the fragmented filter elements of other embodiments of the plate-like filter element according to the present invention.
Figure 6:
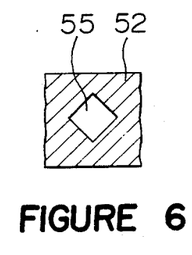
Figure 7:
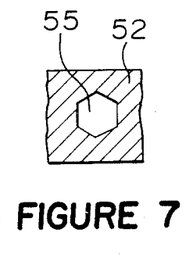
Figure 8:
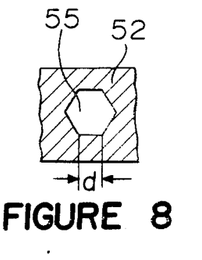

In FIG. 4, circular holes in cross-section are utilized as the through holes 55. However, various cross-sectional shapes may be employed as long as the relations of $b > a$ and $c > a$ are satisfied. Namely, an elliptic hole in cross-section (FIG. 5), a square hole in cross-section (FIG. 6), a hexagonal hole in cross-section (FIGS. 7 and 8) may be employed. In the case of FIG. 8, it is important not to make the length d of a side of the hexagonal hole too large when the side of the inner wall surface 56 of the through hole is in parallel to the side surfaces 57.

In FIG. 1, ribs 58 are respectively formed along the edges of end faces 53, 54, at which a plurality of the through holes 55 are formed, of the plate-like body 52 so as to project on the side of a side surface 57. Although the ribs 58 are not essential to the present invention, they facilitate an assembling work when a plurality of plate-like filter elements are stacked to constitute a filter unit which will be described below.

In the embodiment as shown in FIG. 1, the ribs 58 are projected on the same side of the side surface of the plate-like body 52. However, one of the ribs 58 may be formed on the plate like body 52 at the opposite side to the other rib 58. Further, the ribs 58 may be formed on the plate-like body 52 at both sides just like a T-letter shape or an I-letter shape.

In the embodiment shown in FIG. 1, the ribs 58 are formed along each edge of the opposing end faces of the plate-like body 52. However, a desired number of ribs may be additionally formed between the ribs 58 in parallel thereto. In this case, the ribs define the passages formed between the adjacent plate-like bodies stacked up one on another. Further, it is possible to form a rib along one of the other pair of edges so as to be perpendicular to the ribs 58, and when the filter elements are stacked, the ribs close one of the outlets of the passages formed between the adjacent filter element.

Figure 2:
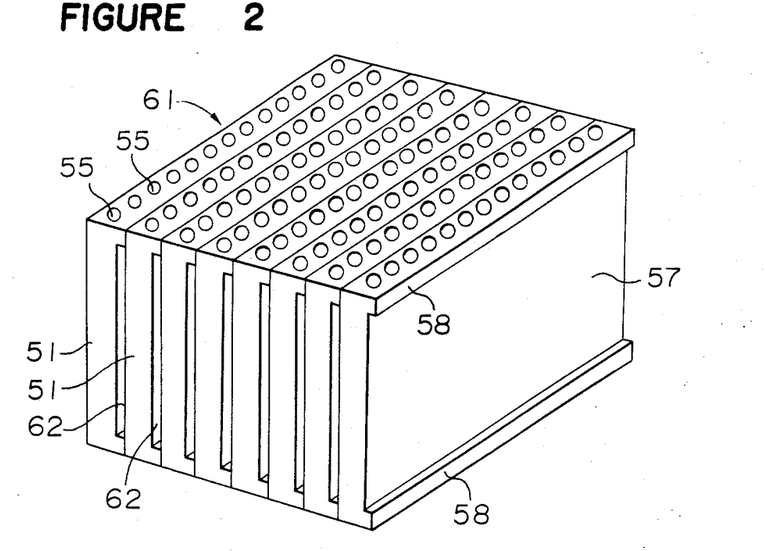
FIG. 2 is a perspective view of an embodiment of the filter unit constituted by stacking the filter elements as shown in FIG. 1, according to the present invention.
Figure 3:
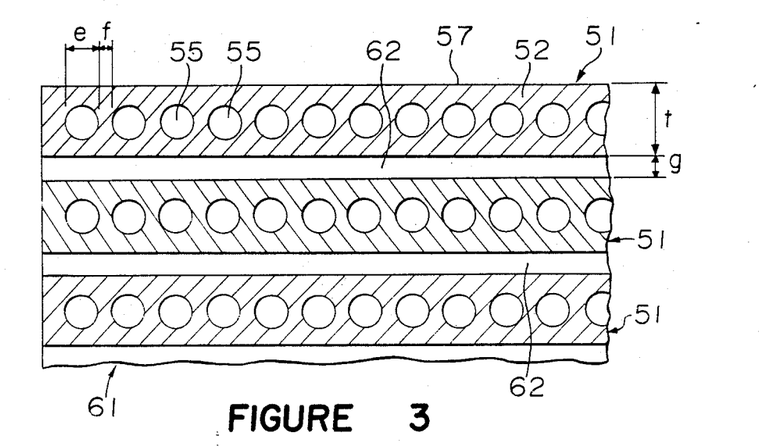
FIG. 3 is a cross-sectional view of the filter unit as shown in FIG. 2.

FIGS. 2 and 3 show a filter unit 61 formed by stacking a plurality of the filter elements 51. The filter unit 61 is provided with a plurality of passages between adjacent filter elements by stacking up the filter elements 51 in a parallel relation, the passages being separated from the through holes formed in the plate-like bodies by porous walls of the plate-like bodies.

In the filter unit 61, the filter elements 51 are so arranged that the end faces having the openings of the through holes 55 are aligned and the ribs 58 formed in the filter elements 51 are oriented in the same direction.

The ribs 58 are joined to the side surfaces 57 of the neighboring filter elements 51 by using for instance a binder having thermal resistant properties in a dust-tight manner. Alternatively, a cushion means or gaskets are interposed between the end surface of the ribs 58 and the side surfaces 57 of the next filter element 51 followed by compressing to bind them. Or, a plurality of the filter elements 51 may be bonded by sintering in one piece in a dust-tight manner. Thus, openings of clean gas passages 62, which are defined by the ribs 58 and the side surfaces 57, are formed at the side different from the side where a plurality of through holes 55 are open by stacking a plurality of the filter elements 51.

The filter unit 61 may be utilized as a filter unit 33 for a filter device as shown in FIG. 10. Namely, when a particulate-containing gas such as an exhaust gas from a diesel engine is fed from one of the inlet ports of the through holes 55, fine particles are trapped on the inner wall surfaces of the through holes, and only cleaned gas is caused to pass through the gas-permeable porous walls of the plate-like bodies 52, so that a cleaned gas is obtained through the clean gas passages 62.

The particulates contained in the particulate-containing gas is trapped on the inner wall surfaces of the through holes 55, and some part of the particulates is remained on the inner wall surfaces while the other part falls down to a particulate receiver 41 from the other openings of the through holes 55 (FIG. 10), where the particulates are collected.

After a period of dust trapping operation, particulates accumulate on the inner wall surfaces of the through holes 55, the filtering loss increased. Then, at appropriate intervals, a back washing operation is conducted by, for instance, ejecting a pressurized gas through a nozzle 40 provided at the outlet side of the clean gas passages as shown in FIG. 10. The pressurized gas ejected from the nozzle induces gas around the nozzle to thereby provide a pulse stream and is blown into the clean gas passages 62. As a result, the pressure of the clean gas passages 62 fairly rises momentarily, and a pressure P is repeatedly applied to the outer surface 57 of the filter elements 51 as shown in FIG. 4. The repeated pressure P functions to crush parts of the porous walls between the through holes 55 and the side surfaces 57. However, in the plate-like filter element of the present invention, the inner wall surface 56 of the through holes 55 is so formed as to be buldged out toward the side surfaces 57 which are closer to the through holes. Accordingly, a bending stress in the walls caused by the pressure P is small from the standpoint of structure-dynamics. Therefore, it is avoidable to cause breakages of the porous filter walls.

In the filter unit 61 as shown in FIG. 2, spacers may be used for separating adjacent filter elements 51 instead of the ribs 58. In this case, the filter elements 51 are in a flat plate form which can easily be manufactured by using for instance an extrusion process.

The ribs 58 may be formed on the plate-like body along the edge of the end faces which are in parallel to the center lines of the through holes 55 passing through the plate-like body, so as to project on the side of the side surface. When a plurality of such filter elements 51 are stacked up, clean gas passages 62 are opened at the same end faces with the openings of the through holes 55. In this case, it is necessary to provide a sealing means to separate the clean gas passages from the dust-containing gas passages.

In the plate-like filter element of the present invention, it is desirable that a plurality of the through holes 55 are used as the dust-containing gas passages and the passages formed between the adjacent side surfaces 57 are used as the clean gas passages. However, it is also possible that the through holes 55 are used as the clean gas passages and the passages between the side surfaces 57 are used as the dust-containing gas passages when there is no danger of breakage of the plate-like bodies.

A preferred embodiment of the filter device of the present invention is illustrated in FIG. 10 and the construction of the filter unit is different from that of Japanese Patent Application No. 232360/1987.

[EXAMPLE]

As an Example of the present invention, a filter unit having a construction as in FIG. 2 was prepared and a filter device having a construction as in FIG. 10 in which the filter unit having the construction as in FIG. 2 was prepared.

For comparison, the filter device as in FIG. 10 in which a filter unit having a construction as in FIG. 9 was prepared. The specifications of the tested filter unit and the conditions of the tests as well as the results of the tests are described below.

A plate-like filter element according to the present invention;

| | |
|---|---|
| Material: | Cordierite |
| Method of shaping: | Casting |
| Porosity: | About 34% |
| Average pore size: | About 22 μm |
| Length × Width × Thickness: | 240 × 224 × 15 mm |
| Diameter of the circular through hole: | 7 mm |
| Pitch of the circular through holes: | 10 mm |

| | |
|---|---|
| -continued | |
| Height of rib: | 2.8 mm |

A filter unit according to the present invention;
25 Pieces of filter elements were stacked up to form a filter block, and a filter unit was prepared by stacking three filter blocks so that the passages formed between the adjacent filter elements are connected. Tests were carried out by using the circular through holes of the filter elements as particulate-containing gas passages and the passages between the adjacent filter elements as clean gas passages.

| | |
|---|---|
| Width of clean gas passage: | About 3.0 mm |
| Effective filter area: | About 7.2 m² |
| Filter unit for comparison: | |
| Material: | Cordierite |
| Method of shaping: | One piece casting |
| Porosity: | About 34% |
| Average pore size: | About 23 μm |
| Length × Width × Height: | 700 × 350 × 350 mm |
| Width of exhaust gas passage: | 5 mm |
| Width of clean gas passage: | 5 mm |
| Effective filter area: | 7.1 m² |
| Conditions of tests | |
| Engine used: | Displacement ... 6.6 l |
| | Direct injection type diesel engine |
| | Rated output ... 180 ps/3000 rpm |
| Exhaust gas: | Engine operated at 2900 rpm × 130 ps |
| | Temperature of exhaust gas ... 550° C. |
| | Flow rate of exhaust gas ... 430 Nm²/hr |
| Conditions of back washing operation | |
| Air pressure (at a pressur source): | 6.0 kg/cm² |
| Back washing period: | 0.1 sec |
| Interval of back washing operation: | 300 sec |
| Ejector nozzle: | Opening diameter of 25 mm × 2 pieces |
| Amount of compressed air for back washing operation: | 85 Nl |
| Result of tests | |
| Average pressure loss of a filter used | |
| Example: | About 1200 mm H₂O |
| Comparative Example: | About 1200 mm H₂O |
| (A decrease of pressure loss was recognized after about 20 hours.) | |
| Concentration of particulates in cleaned gas | |
| Example: | About 3 mg/Nm³ |
| (There is no change after 50 hours.) | |
| Comparative Example: | About 3 mg/Nm³ |
| (The concentration began increasing after about 20 hours and reached about 120 mg/Nm² after 30 hours becaue there caused a damage (a crack) in a filter). | |

One might be afraid that in the plate-like filter element of the present invention, the inner wall surface of the through holes can not be uniformly utilized as a filter area because the thickness of the wall portion between the inner wall surface of the through holes and the side surface of the plate-like body differs and the resistance of permeability is not uniform. However, it was confirmed that the filter element of the present invention could be used without any trouble due to the fact that a pressure loss caused during a dust trapping operation is greatly dependent on a layer of particulates trapped on the filter surface.

Thus, in accordance with the present invention, a plate-like filter element with a plurality of through holes in a plate-like body made of a gas-permeable porous material is formed. A filter unit having a desired filtering surface area can be easily obtained by stacking up adequate number of the filter elements with an appropriate space passages between the adjacent filter elements. The simple processing method of the filter elements substantially reduces the occurrence of faulty products.

As shown in the above-mentioned Example, the breakage of the porous filtering wall, namely, a damage of the filter elements can be prevented even when a highly pressurized gas is introduced in the clean gas passages when a back washing operation is carried out. With the filter element according to the present invention, the inner wall surface of the through holes, which constitute the particulate-containing gas passages, of the filter elements is buldged out toward the side surfaces. This allows the application of high pressure to the wall surfaces.

When a filter device utilizing the filter unit which is formed by stacking up the above-mentioned filter elements is used as a filter device for treating an exhaust gas from a diesel engine, the filter device can be refreshed by a back washing operation, and can be used for a sufficiently long period in a stable manner.

Although the plate-like filter element, the filter unit or the filter device of the present invention is suitable for removing particulates in the exhaust gas discharged from a diesel engine, it can be used for treating dust-containing gas discharged from, for instance, a blast furnace, a converter, a coke oven, a coal gasification apparatus, a nuclear reactor waste burning equipment, a fluid catalytic cracking apparatus, a fluidized bed boiler and so on.

In accordance with the present invention, besides the feature that dust in a dust-containing gas can be removed without cooling the gas with a compact filter device having a large filtering surface area per volume, there are various advantages in industrial use. Namely, there is a new energy saving possibility of recovering heat energy from a hot dust-containing gas, which has not conventionally been carried out because of the presence of dust, can be realized even for an equipment of a small capacity. Further, the dust can be recovered in a dry condition, whereby the collected dust can be effectively utilized.

What is claimed is:

1. A stack of filter plate elements comprising:
    plate bodies made of a gas-permeable porous material, each of said plate bodies having a pair of opposing end faces and having substantially planar and substantially parallel side surfaces which connect said end faces;
    a plurality of through-holes formed in each of said plate bodies and extending from one of said end faces to the other, each of said through-holes having an inner wall surface, wherein an intermediate plane runs parallel to said side surfaces and directly through said holes, said through-holes being circular in a sectional view taken transverse to the intermediate plane, whereby a distance between said side surfaces and said inner wall surfaces of said through-holes varies in a direction along the intermediate plane; and
    ledge means provided on each of said filter plate elements, said ledge means separating said filter plate elements and defining gas passages, said gas passages being transverse to the direction of said through-holes, wherein gas diffused through said through-holes is discharged through said gas passages.

2. The filter plate elements according to claim 1, wherein each intermediate plane of said plurality of through-holes is substantially linear and extends generally in parallel to the others of said intermediate planes.

3. The filter plate elements according to claim 1, wherein said plurality of through-holes have openings at said opposed end faces which are aligned with each other.

4. The filter plate elements according to claim 1, wherein the material for said gas-permeable porous plate bodies is ceramics.

5. The filter plate elements according to claim 1, wherein the material for said gas-permeable porous plate bodies is sintered metal or porous glass.

6. The filter plate elements according to claim 1, wherein said gas passages formed by said edge means have a width substantially equal to the height of said ledge means, and said gas passages are separated from said plurality of through-holes by the porous surfaces of said plate bodies.

7. A stack of filter plate elements comprising:
plate bodies made of a gas-permeable porous material, each of said plate bodies having a pair of opposing end faces and having substantially planar and substantially parallel side surfaces which connect said end faces;
a plurality of through-holes formed in each of said plate bodies and extending from one of said end faces to the other, each of said through-holes having an inner wall surface, wherein an intermediate plane runs parallel to said side surfaces and directly through said holes, said through-holes being elliptical in a sectional view taken transverse to the intermediate plane, whereby a distance between said side surfaces and said inner wall surfaces of said through-holes varies in a direction along the intermediate plane; and
ledge means provided on each of said filter plate elements, said ledge means separating said filter plate elements and defining gas passages, said gas passages being transverse to the direction of said throughholes, wherein gas diffused through said through-holes is discharged through said gas passages.

8. The filter plate elements according to claim 7, wherein each intermediate plane of said plurality of through-holes is substantially linear and extends generally in parallel to the others of said intermediate planes.

9. The filter plate elements according to claim 7, wherein said plurality of through-holes have openings at said opposed end faces which are aligned with each other.

10. The filter plate elements according to claim 7, wherein the material for said gas-permeable porous plate bodies is ceramics.

11. The filter plate elements according to claim 7, wherein the material for said gas-permeable porous plate bodies is sintered metal or porous glass.

12. The filter plate elements according to claim 7, wherein said gas passages formed by said edge means have a width substantially equal to the height of said ledge means, and said gas passages are separated from said plurality of through-holes by the porous surfaces of said plate bodies.

13. A stack of filter plate elements comprising:
plate bodies made of a gas-permeable porous material, each of said plate bodies having a pair of opposing end faces and having substantially planar and substantially parallel side surfaces which connect said end faces;
a plurality of through-holes formed in each of said plate bodies and extending from one of said end faces to the other, each of said through-holes having an inner wall surface, wherein an intermediate plane runs parallel to said side surfaces and directly through said holes, said through-holes being circular in a sectional view taken transverse to the intermediate plane, whereby a distance between said side surfaces and said inner wall surfaces of said through-holes varies in a direction along the intermediate plane;
ledge means provided on each of said filter plate elements, said ledge means separating said filter plate elements and defining gas passages, said gas passages being transverse to the direction of said through-holes, wherein gas diffused through said through-holes is discharged through said gas passages; and
a metallic casing with an inlet for a dust containing gas, an outlet for clean gas and an outlet for dust, which firmly supports said filter elements therein by means of sealing members.

14. The filter plate elements according to claim 13, wherein said filter elements are assembled in a metallic casing using a spring means as a pushing load.

15. The filter plate elements according to claim 13, wherein said outlet for clean gas is equipped with an inlet of compressed gas to effect a back washing operation to refresh said device.

16. A stack of filter plate elements comprising:
plate bodies made of a gas-permeable porous material, each of said plate bodies having a pair of opposing end faces and having substantially planar and substantially parallel side surfaces which connect said end faces;
a plurality of through-holes formed in each of said plate bodies and extending from one of said end faces to the other, each of said through-holes having an inner wall surface, wherein an intermediate plane runs parallel to said side surface and directly through said holes, said through-holes being eliptical in a sectional view taken transverse to the intermediate plane, whereby a distance between said side surfaces and said inner wall surfaces of said through-holes varies in a direction along the intermediate plane;
ledge means provided on each of said filter plate elements, said ledge means separating said filter plate elements and defining gas passages, said gas passages being transverse to the direction of said through-holes, wherein gas diffused through said through-holes is discharged through said gas passages; and
a metallic casing with an inlet for a dust-containing gas, an outlet for clean gas and an outlet for dust, which firmly supports said filter elements therein by means of sealing members.

17. The filter plate elements according to claim 16, wherein said filter elements are assembled in said metallic casing using a spring means as a pushing load.

18. The filter plate elements according to claim 16, wherein said outlet for clean gas is equipped with an inlet of compressed gas to effect a back washing operation to refresh said device.

* * * * *